(12) United States Patent
Rasmussen, Sr.

(10) Patent No.: US 6,260,877 B1
(45) Date of Patent: Jul. 17, 2001

(54) SOFT SHELL AIR BAG

(76) Inventor: William J. Rasmussen, Sr., 2536 Hwy. 15, Wiggins, MS (US) 39577

( * ) Notice: Subject to any disclaimer, the term of this patent is extended or adjusted under 35 U.S.C. 154(b) by 0 days.

(21) Appl. No.: 09/705,895

(22) Filed: Nov. 6, 2000

Related U.S. Application Data

(60) Provisional application No. 60/173,559, filed on Dec. 30, 1999.

(51) Int. Cl.$^7$ .................................................. B60R 21/24
(52) U.S. Cl. ........................................ 280/729; 280/743.1
(58) Field of Search ................................ 280/729, 728.1, 280/731, 732, 736, 741, 742

(56) References Cited

U.S. PATENT DOCUMENTS

| | | | |
|---|---|---|---|
| 3,473,824 | * | 10/1969 | Carey et al. .......................... 280/729 |
| 3,638,755 | * | 2/1972 | Sack ..................................... 181/296 |
| 3,788,663 | * | 1/1974 | Weman ................................. 280/729 |
| 3,843,150 | * | 10/1974 | Harada et al. ........................ 280/729 |
| 3,900,210 | * | 8/1975 | Lohr et al. ............................ 280/729 |
| 3,907,327 | | 9/1975 | Pech . |
| 3,929,350 | * | 12/1975 | Pech ..................................... 280/729 |
| 4,076,277 | * | 2/1978 | Kuwakado et al. .................. 280/738 |
| 4,136,894 | | 1/1979 | Ono et al. . |
| 5,282,646 | | 2/1994 | Melvin et al. . |
| 5,427,410 | | 6/1995 | Shiota et al. . |
| 5,435,594 | | 7/1995 | Gille . |
| 5,468,013 | | 11/1995 | Gille . |
| 5,513,879 | | 5/1996 | Patel et al. . |
| 5,542,695 | * | 8/1996 | Hanson ................................. 280/729 |
| 5,556,056 | * | 9/1996 | Kalberer et al. ..................... 244/121 |
| 5,564,743 | | 10/1996 | Marchant . |
| 5,599,041 | * | 2/1997 | Turnbull et al. ..................... 280/729 |
| 5,762,367 | | 6/1998 | Wolanin . |
| 5,775,729 | | 7/1998 | Schneider et al. . |
| 5,951,038 | | 9/1999 | Taguchi et al. . |
| 6,062,143 | * | 5/2000 | Grace et al. ......................... 102/530 |

FOREIGN PATENT DOCUMENTS

| | | |
|---|---|---|
| 0399498 | 5/1989 | (EP) . |
| 2265118 | 9/1993 | (GB) . |

* cited by examiner

Primary Examiner—Paul N. Dickson
Assistant Examiner—Faye M. Fleming
(74) Attorney, Agent, or Firm—Richard C. Litman

(57) ABSTRACT

A vehicle safety device for protecting users from crash related impacts via a soft shell air bag system having a first and second air bag, wherein the second air bag is made contiguous with the first air bag. The second air bag includes a base rim portion and a surrounding fluid channel for receiving a second, high pressure inflatable medium. There is a first channel(s) disposed within the second channel concentric therewith for separately providing an uninhibited first, low pressure inflatable medium to the first air bag for full inflatable deployment subsequent to a sensed crashed condition. A first and second fluid supply connection is made to each respective first and second inflatable air bags to provide a low pressure inflatable bag for user impact in sequence with a high pressure air bag, respectively, to cushion the impact between the user and interior vehicle structures.

15 Claims, 3 Drawing Sheets

SOFT SHELL AIR BAG

CROSS-REFERENCE TO RELATED APPLICATION

This application claims the benefit of U.S. Provisional Patent Application Serial No. 60/173,559, filed Dec. 30, 1999.

BACKGROUND OF THE INVENTION

1. Field of the Invention

The present invention relates generally to air bags. More specifically, the invention is a vehicle air bag device having a secondary air bag disposed on an adjacent wall of a primary air bag with dual inflation mechanisms, thus to provide upon deployment a cushioned or soft shell impact with a user.

2. Description of Related Art

Numerous air bag systems have been devised for providing occupant restraint within interior portions of vehicles. Most air bag systems are housed in the steering column on the driver's side, and in a separate compartment within the dashboard on the passenger side. The primary modification to the conventional dual air bag system has been directed to minimizing injuries to passengers during the initial phase of deployment of the air bag, under near rip seam pressures. However, there has yet to be provided an air bag system which utilizes a soft shell pressure differential as a remedy to the problem.

For example, U.S. Pat. No. 3,907,327 issued to Pech discloses a safety device with an inflatable cushion which provides effective protection during successive collisions. The device comprises a detector which controls the actuation of pressurized gas for inflating the safety cushion. The cushion has two walls made of flexible material, which are of substantially the same dimensions, located one inside the other. The cushion expands in a conventional manner via pressurized gas and takes up a position between a person or passenger to be protected and the rigid structures of a vehicle. The interior walls of the inflatable cushion are connected as discontinuous elements which form non-communicating chambers.

Non-communicating inflatable chambers have been widely used in conventional air bag systems. U.S. Patents issued to Melvin et al. (U.S. Pat. No. 5,282,646), Shiota et al. (U.S. Pat. No. 5,427,410), Gille (U.S. Pat. No. 5,435,594 and U.S. Pat. No. 5,468,013) disclose multi-chamber or dual chamber systems as non-communicating chambers. The general arrangement includes an inflatable chamber disposed within another inflatable chamber which deploys upon a sensed crash event. A single pressurized gas channel is used to inflate each non-communicating chamber simultaneously.

U.S. Pat. No. 5,282,646 issued to Melvin et al. discloses a multi-chamber air bag having a displacement responsive valve. The air bag also has an internal dividing wall which divides the air bag into a first chamber communicating directly with the inflator and a second chamber defined between the dividing wall and the occupant-contacting face wall. A first opening in the dividing wall between the chambers communicate inflation gas from the first chamber to the second chamber to inflate the second chamber. A second opening in the dividing wall is normally closed by a vent flap or tethered flap which is operably connected to the occupant-contacting face wall so that the inflation of the second chamber and resultant travel of the face wall toward the occupant and away from the dividing wall will move the valve flap to an open position to further inflate the air bag.

Other conventional air bag systems include canisters which have dual stage inflators. Among these are U.S. Patents issued to Patel et al. (U.S. Pat. No. 5,513,879), Marchant (U.S. Pat. No. 5,564,743), Wolanin (U.S. Pat. No. 5,762,367) and Taguchi et al. (U.S. Pat. No. 5,951,038). These devices work on the general principle wherein a two stage inflator provides a gentle onset of inflation during the initial employment to help protect out-of-position passengers. A second rapid stage is ignited passively by hot gas communication from the first stage. The inflation gases from both stages flow through a module funnel into the air bag. Multiple air bag arrangements for the head, torso and knees are disclosed in the U.S. Pat. No. 5,775,729 issued to Schneider et al.

Foreign Patents granted to Hirokazu (EPO 0399498) and Iritani (GB 2265118) disclose similar air bag constructions which are of general relevance to the soft shell air bag system. The air bag system taught by Iritani discloses an inner and outer chamber system with the wall of the inner chamber having a plurality of apertures for supplying gas to the second or outer chamber.

None of the above inventions and patents, taken either singly or in combination, is seen to describe the instant invention as claimed.

SUMMARY OF THE INVENTION

The vehicle safety device for protecting users from crash related impacts according to the invention is a soft shell air bag system which includes a first and second air bag, wherein the second air bag is made contiguous with the first air bag. The first air bag includes a base rim portion and a surrounding fluid channel for receiving a first inflatable medium. At least one second channel is disposed within the first channel, concentric therewith, for separately providing an uninhibited second inflatable medium to the second air bag for full inflatable deployment, subsequent to a sensed crashed condition. A first and second fluid supply connection is made to the respective first and second inflatable air bags to provide a low pressure inflatable bag for user impact in sequence with a high pressure air bag, to cushion the impact between the user and the structures within an interior portion of a vehicle. The vehicle safety device is constructed of a flexible and durable material for extended and repetitive use.

Accordingly, it is a principal object of the invention to provide an air bag system which utilizes an enveloped air bag arrangement in direct communication to produce a soft shell, user-to-bag interface at impact according to a predetermined pressure differential.

It is another object of the invention to a soft shell air bag system having a plurality of fluid (e.g., gas) channels for sequentially inflating each respective air bag.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
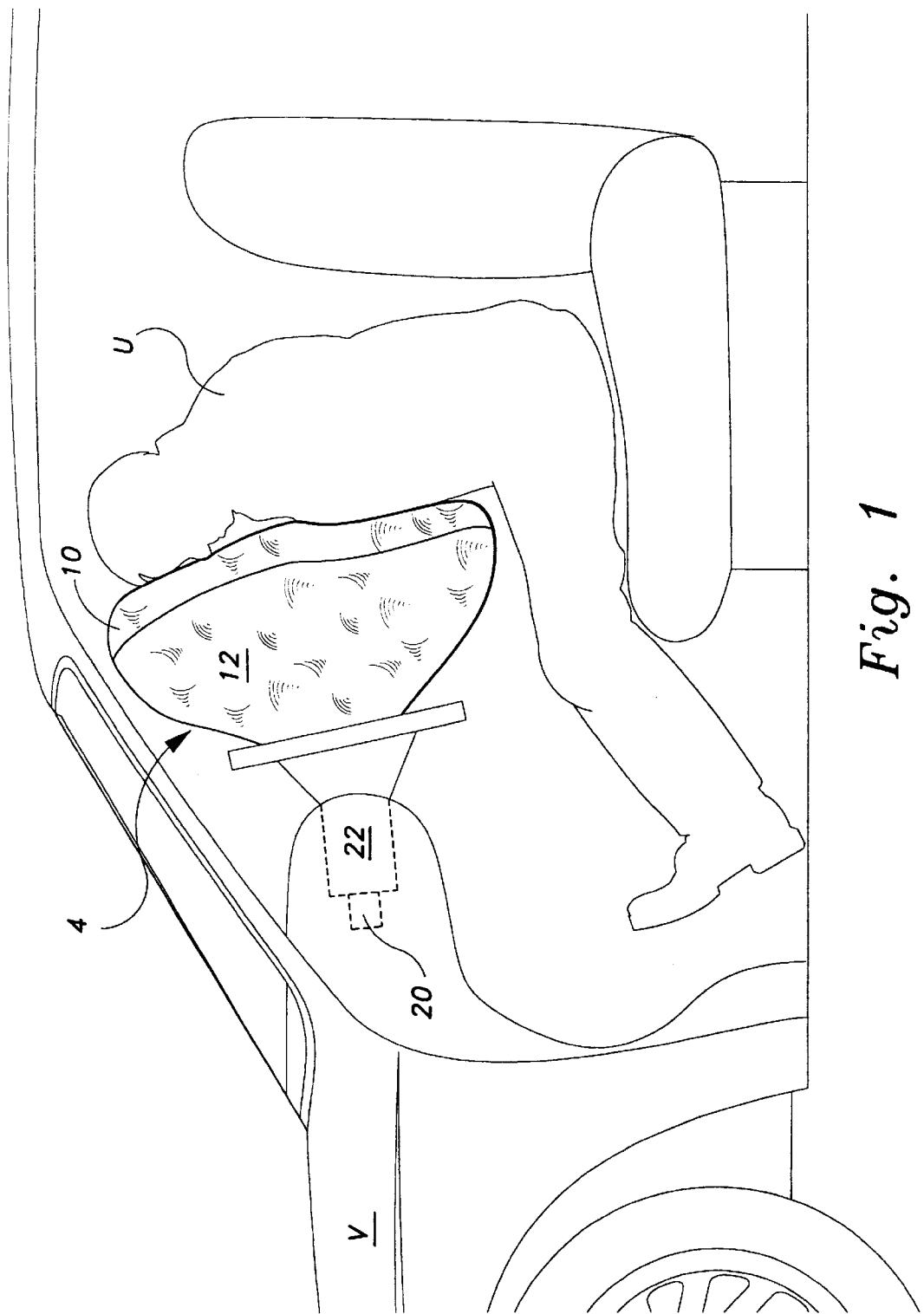
FIG. 1 is an environmental, perspective view of a soft shell air bag according to the present invention.
Figure 2:
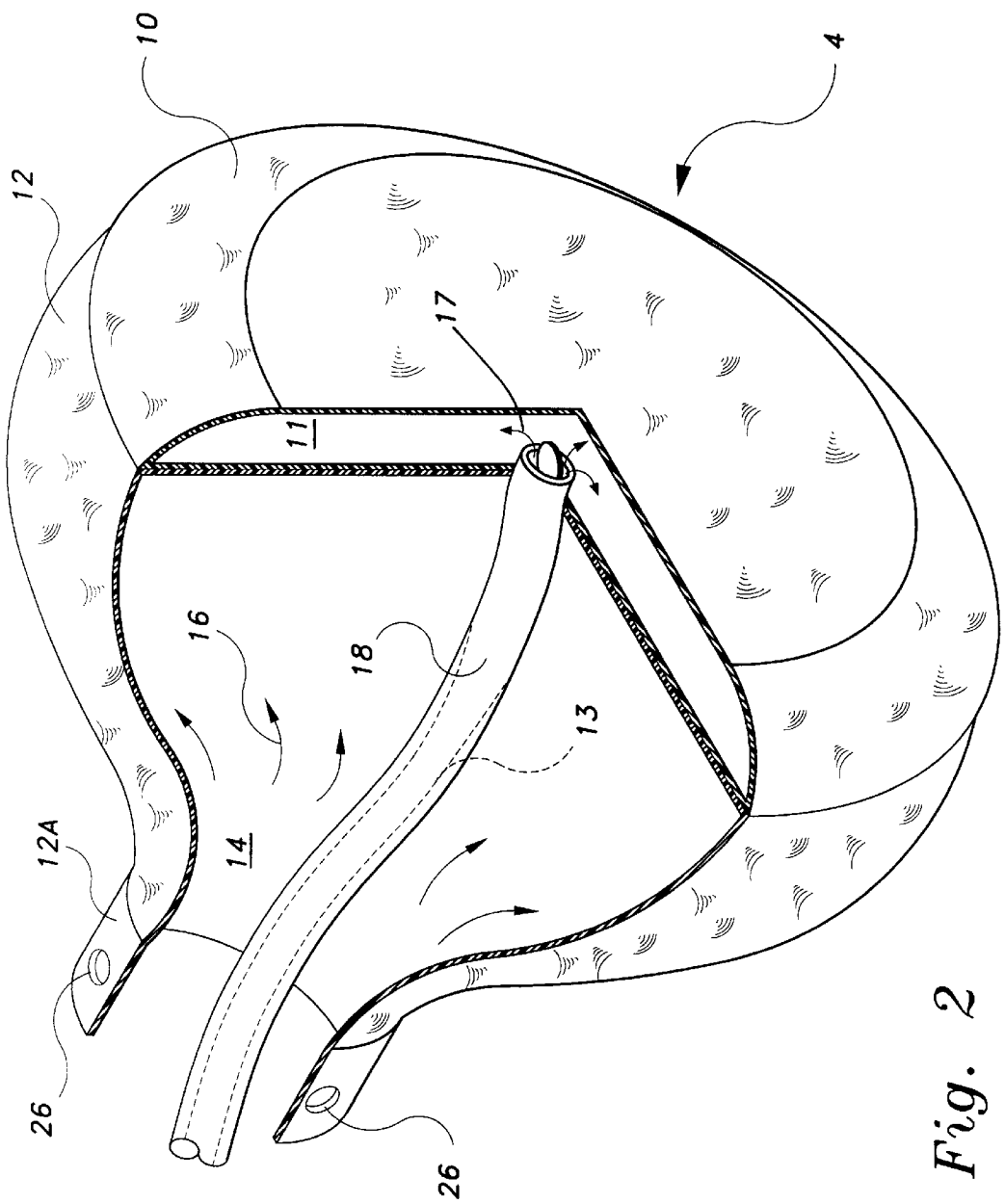
FIG. 2 is a perspective, part section view of the soft shell air bag system according to a first embodiment of the invention, illustrating combination low and high pressure air bag chambers with a centrally disposed channel having a one-way valve mechanism.
Figure 3:
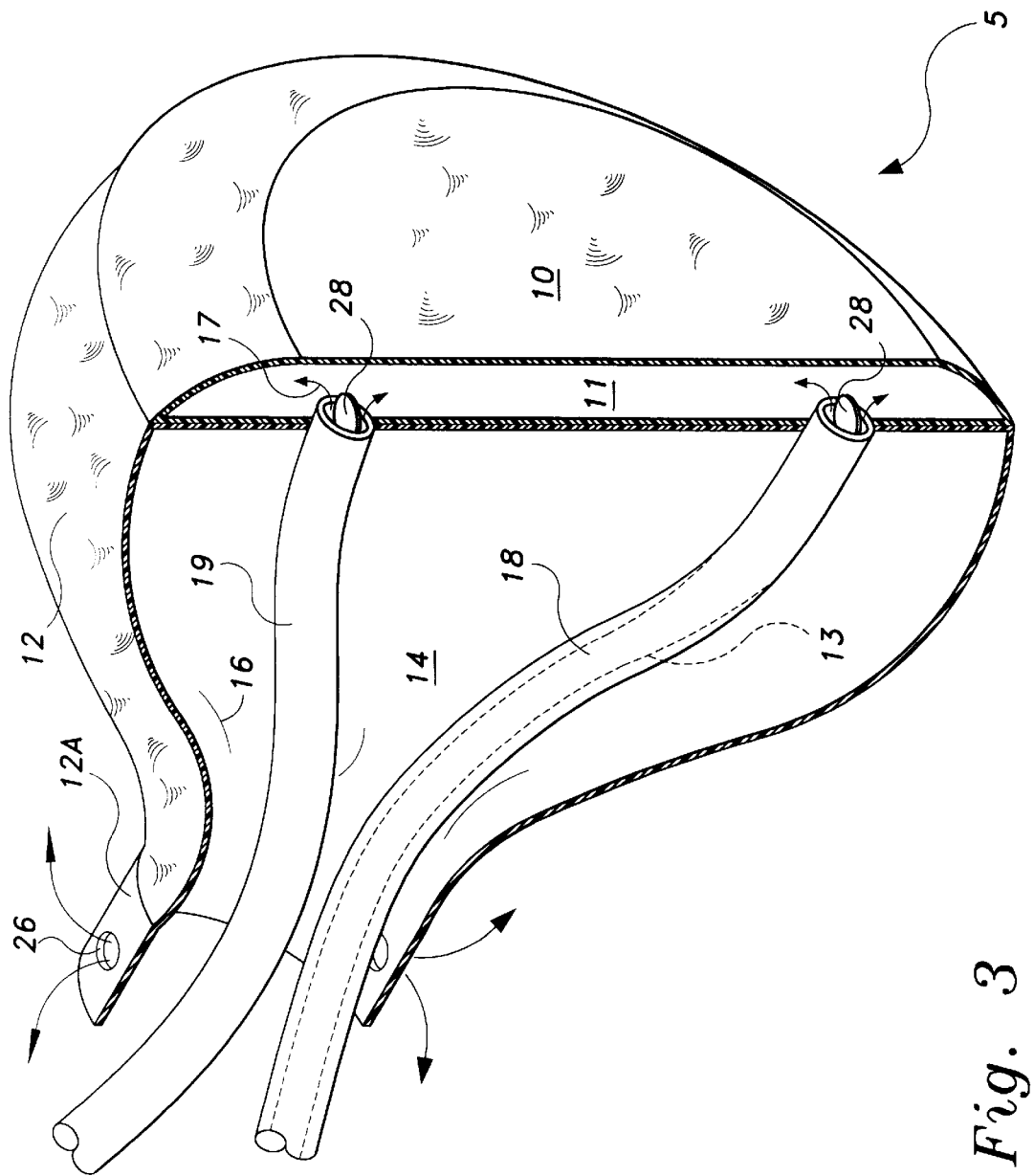
FIG. 3 is a perspective view of the soft shell air bag system according to a second embodiment of the invention, illustrating dual low pressure gas supply channels.

The present invention is directed to a vehicle safety device for protecting at least one user U from crash related impacts within an interior portion of a vehicle V. The preferred embodiments of the present invention are depicted in FIGS. 1–3, and are generally referenced by numerals 4 and 5, respectively. The areas of application of this device is not limited to front passenger areas alone, but can include activation from side panels of vehicle doors (i.e. Sports Utility Vehicles (SUVs) and the like). These particular areas of application will protect passengers from impact with interior vehicle structures due to unexpected swerving or vehicle roll-over.

As best seen in FIGS. 1 and 2, the deployable air bag system 4 comprises a first air bag 10 and second air bag 12, wherein the second air bag 12 is made contiguous with the first air bag 10 via an adjoining wall layer 11. The second air bag 12 further comprises a base rim portion 12a and a second chamber 14 for receiving a second inflatable medium 16, and at least one first channel 18 (as diagrammatically illustrated in FIG. 3) disposed within the second chamber or channel 14 concentric therewith for separately providing a substantially uninhibited first inflatable medium 17 to the first air bag 10, for full capacity deployment subsequent to a sensed crashed condition.

Crash sensing devices are well known and require only ordinary skill in the art to implement. The canister and packaging arrangements can include any number of arrangements currently available to one having ordinary skill in the art. While no particular canister arrangement has been explicitly specified, it would be obvious to one having ordinary skill in the art to provide a canister arrangement which operatively produces the deployable soft shell air bag system as herein disclosed.

As seen in FIG. 1, a first 20 and second 22 fluid supply means for supplying the first 16 and second 17 inflatable mediums to the respective first air bag 10 and second air bag 12 are preferably low and high pressure gas supply systems which are widely available and well known in the relevant art. Any comparable conventional gas supply unit can be used so long as it is used within the scope and intent of the invention as herein disclosed.

As diagrammatically illustrated in FIG. 1, the vehicle safety device 4 is shown disposed within the steering column of a vehicle V. However, other non-deployed arrangements can be used such as separate compartments for front and rear passengers. The optimum location for the soft shell air bag system 4 will depend on type and nature of a crash event and/or the susceptibility of sustained injuries from interior structures of a particular type of vehicle and any relevant actuarial data.

The preferred deployment of the soft shell air bag system is as follows. The first air bag 10 receives low pressure gas from means 20 via gas supply channel 18, in sequence with the supply of high pressure gas from means 22 to the second air bag 12 via gas supply chamber or channel 14. As indicated by dotted lines 13, an alternate arrangement of the fluid supply channels include the 10 second 14 and first 18 fluid channels being funnel shaped. This particular configuration reduces the possibility of air bag ruptures from the supply of an gas stream directed to a single location. An additional measure for reducing similar effects associated with air bag rupture includes a plurality of effluent passage channels 26 peripherally disposed within the base rim portion 12a for relieving fluid from at least one fluid supply channel.

As diagrammatically illustrated in FIG. 3, the vehicle safety device 5 according to a second embodiment shows two first channels 18 and 19 connected to the base or wall layer 11 of the air bag system. This arrangement supplies gas for inflating the low pressure air bag via one-way flow valve mechanisms 28 whereby the channels are disposed in direct alignment by a predetermined distance, which further reduces rupture related phenomenon from a single non-divergent gas supply channel.

Each respective air bag 10, 12 receives fluid from respective low and high pressure canister(s), and are preferably made of a durable and flexible material such as nylon or similar material. Other advantages of the soft shell air bag system includes wherein the thickness of the bag is designed to minimize material costs without compromising the needed strength requirements of the air bag system, and subsequent user protection from impacts therewith.

It is to be understood that the present invention is not limited to the embodiments described above, but encompasses any and all embodiments within the scope of the following claims.

I claim:

1. A vehicle deployable air bag system for protecting users from crash related impacts comprising:

a first and a second air bag, and a first and a second fluid channel, wherein said second air bag is contiguous with the first air bag, the second air bag further comprising a base rim portion and said second fluid channel for receiving a second inflatable medium, and said first channel disposed within said second channel, generally concentrically therewith, for separately providing a substantially uninhibited first inflatable medium to the first air bag for full capacity deployment after a sensed crashed condition, and a first and second fluid supply means for supplying said first and second inflatable mediums, respectfully.

2. The vehicle safety device according to claim 1, wherein said first fluid supply means is a low pressure fluid supply means, and said second fluid supply means is a high pressure fluid supply means.

3. The vehicle safety device according to claim 2, wherein said first and second fluid channels are funnel shaped.

4. The vehicle safety device according to claim 1, wherein said air bag system further comprises a plurality of effluent passage channels peripherally disposed within the base rim portion for relieving fluid from at least one of said first and second fluid channels.

5. The vehicle safety device according to claim 1, wherein said at least one second channel includes two channels connected to a base portion of the second air bag, wherein said channels are in direct alignment by a predetermined distance for multiple channel fluid flow.

6. The vehicle safety device according to claim 1, wherein said first and second fluid supply means are respective are low and high pressure canisters.

7. The vehicle safety device according to claim 1, wherein said first and second air bags are made of soft shell nylon.

8. A vehicle deployable air bag system for protecting users from crash related impacts comprising, in combination with a pressure activated canister:

a first and a second air bag, and a first and a second fluid channel, wherein said second air bag is contiguous with the first air bag, the second air bag further comprising a base rim portion and said second fluid channel for receiving a second inflatable medium, and said first channel disposed within said second channel, generally concentrically therewith, for separately providing a substantially uninhibited first inflatable medium to the first air bag for full capacity deployment after a sensed crashed condition, and a first and second fluid supply means for supplying said first and second inflatable mediums, respectfully.

9. The vehicle safety device according to claim 8, wherein said first fluid supply means is a low pressure fluid supply means, and said second fluid supply means is a high pressure fluid supply means.

10. The vehicle safety device according to claim 9, wherein said first and second fluid channels are funnel shaped.

11. The vehicle safety device according to claim 8, wherein said air bag system further comprises a plurality of effluent passage channels peripherally disposed within the base rim portion for relieving fluid from at least one of said first and second fluid channels.

12. The vehicle safety device according to claim 8, wherein said at least one second channel includes two channels connected to a base portion of the second air bag, wherein said channels are in direct alignment by a predetermined distance for multiple channel fluid flow.

13. The vehicle safety device according to claim 8, wherein said first and second fluid supply means are respective are low and high pressure canisters.

14. The vehicle safety device according to claim 8, wherein said first and second air bags are made of soft shell nylon.

15. The vehicle safety device according to claim 8, wherein said first and second air bags are packaged within said pressure activated canister.

* * * * *